No. 890,580.  
PATENTED JUNE 9, 1908.
J. H. SUTCLIFFE.  
OPHTHALMOMETER.  
APPLICATION FILED AUG. 23, 1907.
4 SHEETS—SHEET 1.
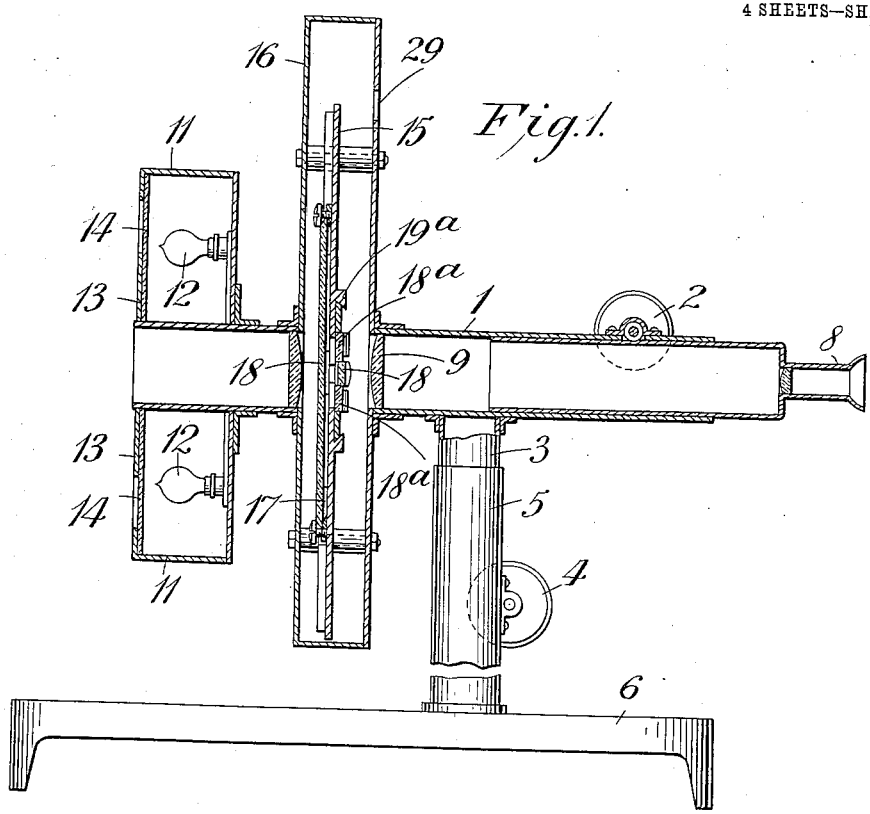
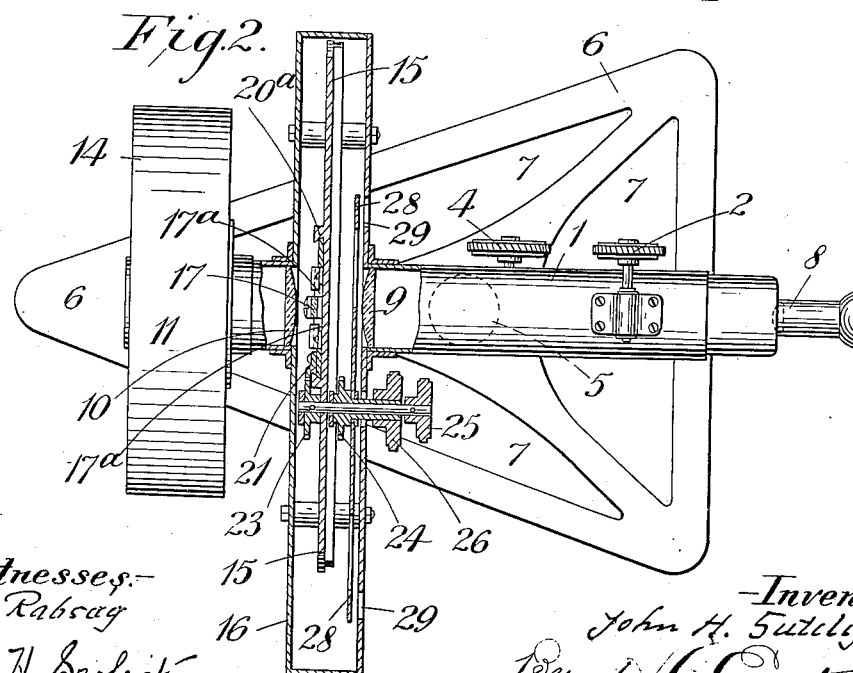
Witnesses—  
A. H. Rabsay  
Max H. Snolovitz
Inventor—  
John H. Sutcliffe  
By N. C. Cvert & Co.  
Attorneys.

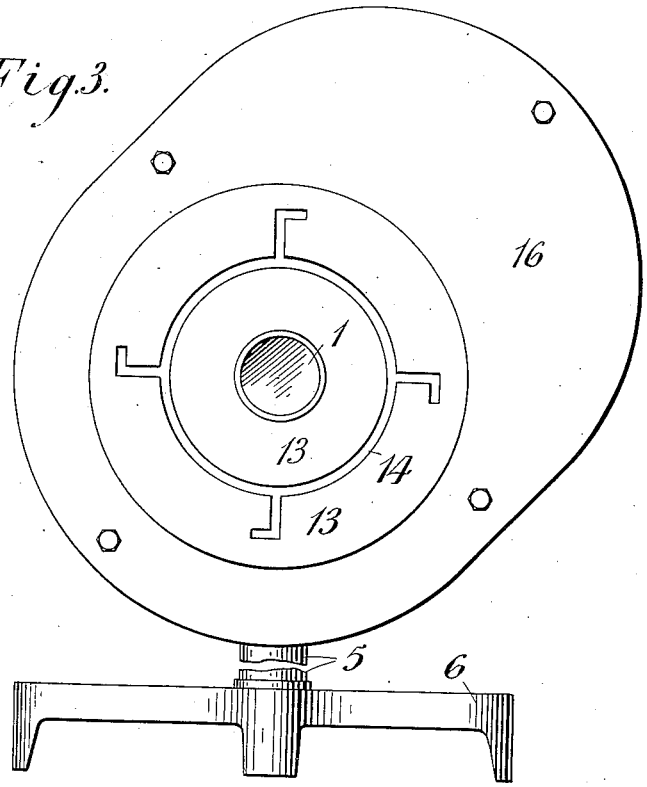
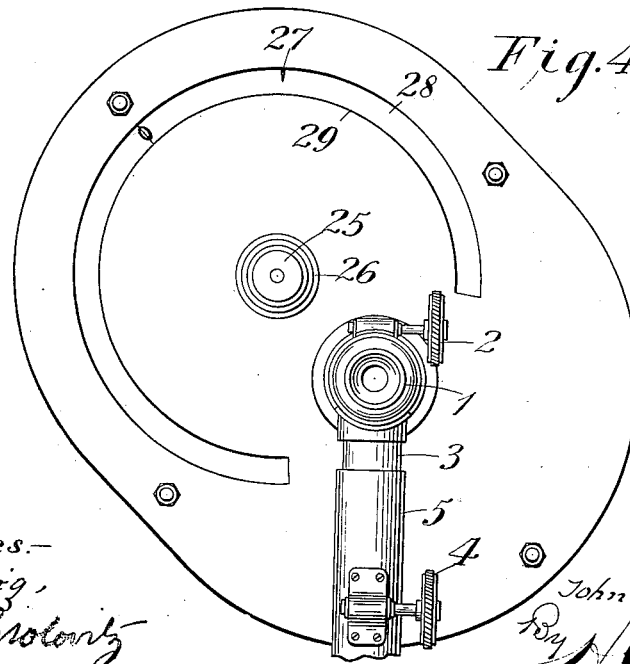

No. 890,580.

PATENTED JUNE 9, 1908.

J. H. SUTCLIFFE.
OPHTHALMOMETER.
APPLICATION FILED AUG. 23, 1907.

4 SHEETS—SHEET 3.

Witnesses:
A. H. Rabsag,
Max H. Srolovitz

Inventor:
John H. Sutcliffe
By H. C. Evert Co.
Attorneys

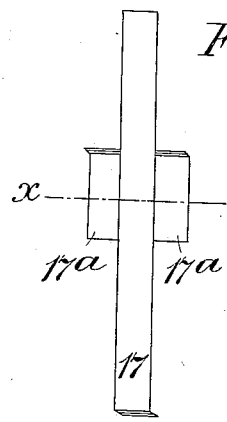
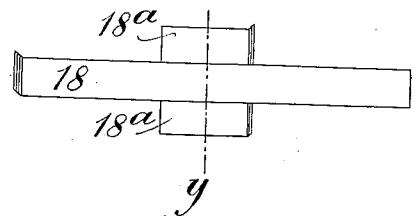
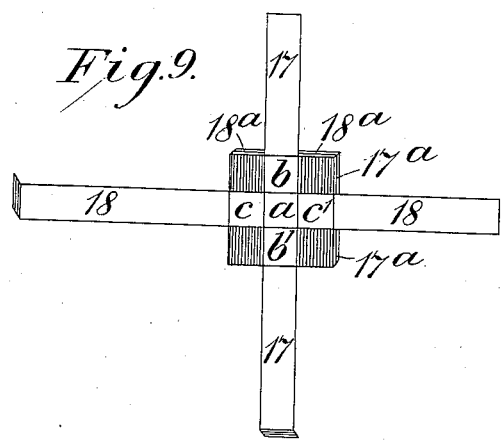
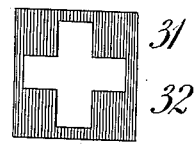
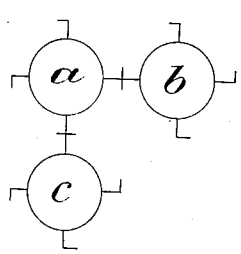
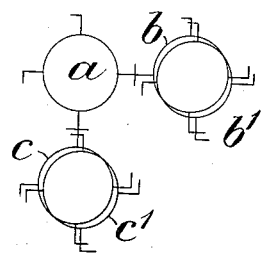

UNITED STATES PATENT OFFICE.

JOHN HAMER SUTCLIFFE, OF LONDON, ENGLAND, ASSIGNOR TO GEORGE CULVER LTD., OF LONDON, ENGLAND.

OPHTHALMOMETER.

No. 890,580.   Specification of Letters Patent.   Patented June 9, 1908.

Application filed August 23, 1907. Serial No. 389,838.

*To all whom it may concern:*

Be it known that I, JOHN HAMER SUTCLIFFE, a subject of the King of Great Britain and Ireland, residing at 199 Piccadilly, in the county of London, England, have invented certain new and useful Improvements in Ophthalmometers, of which the following is a specification, reference being had therein to the accompanying drawings.

This invention relates to ophthalmometers such as are employed by opticians for measuring the curvature of the convex surfaces of the eye, and more especially for measuring the curvature of the cornea in different meridians and thus determining the amount and axis of corneal astigmatism.

In instruments of the kind referred to, the reflection in the convex corneal surface of an illumined object known as the mire is viewed through a telescope furnished with means for rendering visible to an observer a double or multiple image of this reflection; and the curvature of the reflecting surface in any meridian is estimated by the amount of adjustment requisite to bring the inner peripheries of a pair of images on that meridian into exact contact with each other. The adjustment referred to has heretofore been effected either by moving the mire in the direction of the optical axis of the telescope so as to vary its distance from the reflecting surface of the eye; by dividing the mire into component parts which are movable in relation to each other transversely to the optical axis so as to vary the size of the mire, or by moving the doubling device in the axial direction so as to vary the separation of the images which it produces.

Now this invention has reference mainly to a new method of producing the double or multiple images in question, according to which these images are formed and moved by means of an exceedingly weak lens system that is arranged as a component of the telescope objective and is divided into portions movable in relation to each other transversely to the axis of the telescope.

Figure 5:
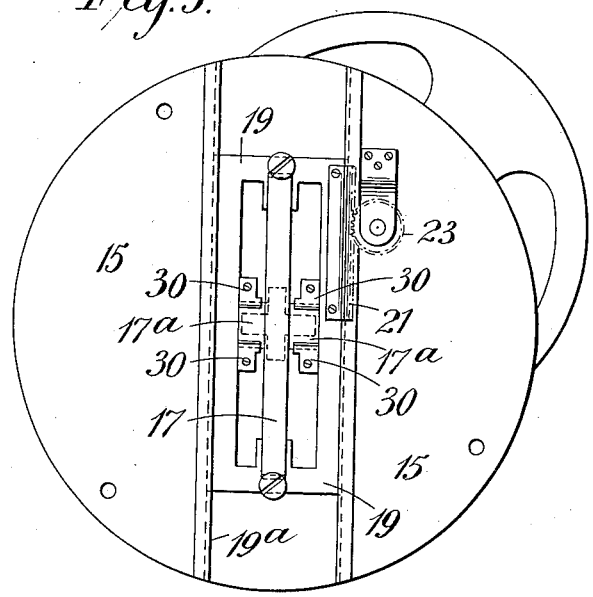
Figure 6:
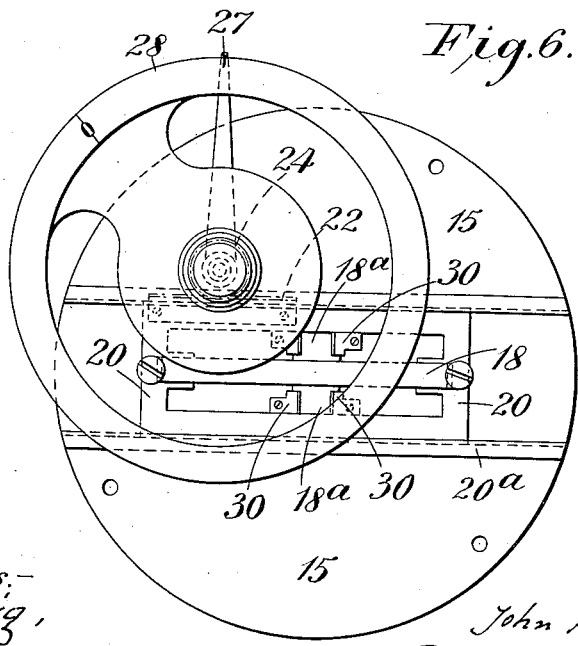

In order that my said invention may be more clearly understood and reduced to practice, it is hereinafter described with reference to the accompanying drawings, wherein Figure 1 is a longitudinal vertical section of an ophthalmometer in accordance therewith; Fig. 2 is a plan of the same, partly in section; Fig. 3 is an end elevation viewed from the side of the patient; Fig. 4 is an end elevation viewed from the side of the observer; Figs. 5 and 6 are transverse elevations of the portion of the ophthalmometer comprising the movable lens system and adjusting mechanism therefor, viewed respectively from the side of the patient and of the observer; Figs. 7 and 8 are diagrammatic representations of the glasses respectively shown in Figs. 5 and 6; Fig. 9 is a representation of these glasses in combination; Fig. 10 represents an alternative constructional detail; and Figs. 11 and 12 are diagrammatic views of the multiple images of the mire as seen by the observer when the telescope is respectively in and out of focus, when these images have been brought into contact.

Referring now to the drawings; the telescope 1, which can be focused by means of a milled head 2 in the usual manner, is mounted on a support 3 that is vertically adjustable by means of a milled head 4 within a hollow standard 5 supported on a base 6; this base being preferably of triangular form, cast or otherwise formed integrally with the standard 5, and formed with apertures 7, so as to afford stability and rigidity without undue increase of weight. The telescope 1 is furnished with the usual eye-piece 8, and with a pair of lenses 9, 10, which in combination with the doubling or multiplying lens system interposed between them, constitute a compound objective. On the end of the telescope nearest the patient there is mounted the opaque casing 11, the interior of which is suitably illuminated, as by means of electric glow lamps 12, while its face 13, is furnished with a translucent portion 14, that constitutes the mire and is preferably of the form shown in Fig. 3, consisting of a circle having at the extremities of its vertical and horizontal diameters L-shaped projections.

The apparatus for producing multiple images of the mire, and for effecting the approximation and separation of these images, which constitutes the most important feature of this invention, is most clearly shown in Figs. 5 to 9 of the drawings. This apparatus, which is mounted on both sides of a base plate 15 arranged within a casing 16 of somewhat oval form, preferably comprises a pair of cylindrical lenses of equal power and small curvature, say about $\frac{1}{4}$ diopter, that are crossed at right angles, so as to form an equivalent for a spherical lens of correspondingly low power. Each of these lenses is divided in the direction of its length into three portions, of which the two outer portions are fixed, while the central portion is movable lengthwise to effect the approximation and separation of the images. These central and marginal portions are respectively numbered 17, 17ª and 18, 18ª, as shown in Figs. 7 and 8, wherein the dotted lines x, y, indicate the axial directions of the cylindrical surfaces. The glasses 17, 18 are respectively mounted in frames 19, 20, that slide in guides 19ª, 20ª, secured on opposite sides of the base 15 and are provided with racks 21, 22 with which there engage pinions 23, 24. The arrangement of racks and pinions may obviously be considerably varied; that shown in Fig. 2 of the drawings, wherein the pinions 23, 24 are respectively rotated by concentric milled heads 25, 26, possesses, however, the advantages of compactness and ease of manipulation, while the milled heads are moreover so located that they can be rotated to adjust the glasses without distracting the eye of the patient.

With the pinions 23, 24, there are respectively connected a pointer 27 and an annular index 28 both visible through a slot 29 in the casing 16.

The marginal glasses 17ª, 18ª are kept in position by means of small clamps 30 screwed or otherwise attached to the base plate 15; these clamps serving also as screws to stop out the overlapping portions of the glasses 17ª, 18ª that are shaded in Fig. 9 and to prevent the formation of an additional image or images by these portions. In addition to, or as a substitute for, the clamps 30, there may be employed on each side of the base plate 15 an opaque shield 31 having a cross-shaped aperture 32.

For the purpose of explaining the operation of the instrument hereinbefore described it will for the present be assumed that the telescope 1 is correctly focused, and that there is viewed through it the reflection of the mire in the cornea of a patient. If now the glasses 17, 18 are both in their central positions, so that the six glasses 17, 18, 17ª, 18ª constitute the equivalent of a spherical lens, there will be visible to the eye of the observer a single image of the mire. By moving the glass 17 upwards this image is doubled, the additional image thus produced moving upwards with the glass. Should the glass 18 now be moved to the left the original image will move bodily to the left with it, while the image produced by the upward movement by the glass 17 will also be doubled. By the adjustment of the glasses 17, 18 there can thus be produced the compound image shown in Fig. 11, consisting of the three images a, b, c, of the mire in exact contact with each other; and by the amount of these adjustments the curvatures of the vertical and horizontal meridians of the cornea are determined. The images a, b, c of Fig. 11 are respectively formed by the parts of the glasses 17, 18 crossing at a of Fig. 9, the parts of the glasses 17, 18ª crossing at b, b', and the parts of the glasses 18, 17ª crossing at c, c' of Fig. 9. In focusing the telescope advantage is taken of the known fact that should the central strip of a lens be removed, its marginal portions, when the lens is out of focus, produce separate images. In consequence of this fact, unless the telescope 1 is accurately focused, the portions b, b', c, c' of Fig. 9, instead of producing single images b, c, as shown in Fig. 11 will produce double images b, b', c, c', such as shown in Fig. 12. These images need not, of course, be in contact. There is thus a positive test for correct focus, totally independent of the personal equation of the observer, with the result that one of the most troublesome sources of error in observation is eliminated.

The index 28 is preferably graduated with a scale of curvatures in diopters, and the movement of the pointer 27 over this scale is obviously a differential one, indicating directly by its position in relation to the zero of the scale the difference of curvature of the two corneal meridians under observation, and obviating the necessity for subtracting curvatures. An ophthalmometer in accordance with this invention thus possesses the considerable advantage over such instruments as heretofore constructed that the difference of curvature of two meridians at right angles to each other can be directly determined without the necessity of rotating the mire through a right angle to measure the second curvature.

What I claim is:—

1. In an ophthalmometer, a telescope provided with an objective; a mire the reflection of which in the cornea of the eye is adapted to be viewed through said telescope; and for producing a plurality of images thus viewed and effecting the approximation and separation of said images, an auxiliary lens system arranged as a component of said objective and composed of portions movable in relation to each other transversely to the axis of said telescope.

2. In an ophthalmometer, a telescope provided with an objective, a mire the reflection of which in the cornea can be viewed through said telescope; and for producing a plurality of images of said mire, an auxiliary lens system comprising a pair of lenses each divided into a central portion and marginal portions movable relatively to said central portion transversely to the axis of said telescope.

3. In an ophthalmometer, a telescope provided with an objective, a mire the reflection of which in the cornea can be viewed through said telescope; and, for doubling or multiplying the image thus viewed, a pair of crossed cylindrical lenses each divided longitudinally into central and marginal portions movable in relation to each other transversely to the axis of the telescope.

4. In an ophthalmometer, in combination with a telescope and a mire whose reflection in the eye can therethrough be viewed; means for doubling or multiplying the image thus viewed comprising an auxiliary lens system embodying a pair of crossed lenses each divided longitudinally into central and marginal portions movable in relation to each other transversely to the axis of the telescope.

5. In an ophthalmometer, a telescope provided with an objective; a mire the reflection of which in the cornea of the eye is adapted to be viewed through said telescope; for producing a plurality of images thus viewed and effecting the approximation and separation of said images, an auxiliary lens system arranged as a component of said objective and composed of portions movable in relation to each other transversely to the axis of said telescope geared to one of said movable lens portions an index, and to another of said portions a pointer adapted to move over said index to indicate the relative movement of said portions.

6. In an ophthalmometer a mire consisting of a luminous circle having at the extremities of two of its diameters at right angles L-shaped extensions projecting outwardly from said circle; means for illuminating said mire; a telescope concentric with said mire and adapted for viewing the reflection thereof in the cornea; and means for producing a plurality of images of said mire and bringing the L-shaped extensions of adjacent images into contact, comprising a pair of lenses each divided into central and marginal portions some of which are movable in relation to the remainder transversely to the axis of the telescope.

7. In an ophthalmometer a mire consisting of a luminous circle having at the extremities of two of its diameters at right angles L-shaped extensions projecting outwardly from said circle; means for illuminating said mire; a telescope concentric with said mire and adapted for viewing the reflection thereof in the cornea; and means for producing a plurality of images of said mire and bringing the L-shaped extensions of adjacent images into contact, comprising a pair of crossed cylindrical lenses each divided longitudinally into central and marginal portions relatively movable transversely to the axis of the telescope.

8. In an ophthalmometer, a mire consisting of a luminous circle having at the extremities of two of its diameters at right angles L-shaped extensions projecting outwardly from said circle; means for illuminating said mire; a telescope concentric with said mire and adapted for viewing the reflection thereof in the cornea; means for producing and adjusting three images of said mire, comprising a pair of crossed cylindrical lenses each divided longitudinally into central and marginal portions relatively movable transversely to the axis of the telescope, and, for preventing the formation of a fourth additional image, clamps that also serve to support said marginal lens portions.

9. In an ophthalmometer, a mire consisting of a luminous circle having at the extremities of two of its diameters at right angles L-shaped extensions projecting outwardly from said circle; means for illuminating said mire; a telescope concentric with said mire and adapted for viewing the reflection thereof in the cornea; means for producing and adjusting three images of said mire, comprising a pair of crossed cylindrical lenses each divided longitudinally into central and marginal portions relatively movable transversely to the axis of the telescope, and, for preventing the formation of a fourth additional image, clamps that also serve to support said marginal lens portions; geared to one of said transversely movable lens portions an index, and to the other of said portions a pointer movable over said index.

10. In an ophthalmometer, a telescope furnished with an objective; a luminous mire whose reflection in the cornea can be viewed through said telescope; means for illuminating said mire; for doubling said reflection when thus viewed on one corneal meridian and bringing into contact the pair of images so formed; a lens divided into relatively movable central and marginal portions; for doubling said reflection on a second corneal meridian at right angles to first-mentioned meridian and bringing into contact this second pair of images, a second lens similarly divided and movable; and respectively connected with first and last mentioned movable lens portions an index and a pointer movable over said index to indicate directly the difference of movement of said first and second lens portions and consequently the difference of curvature of two corneal meridians at right angles to one another.

In testimony whereof I affix my signature in the presence of two witnesses.

JOHN HAMER SUTCLIFFE.

Witnesses:
HOWARD P. THOMPSON,
G. R. BORCHAM.